Patented Dec. 5, 1922.

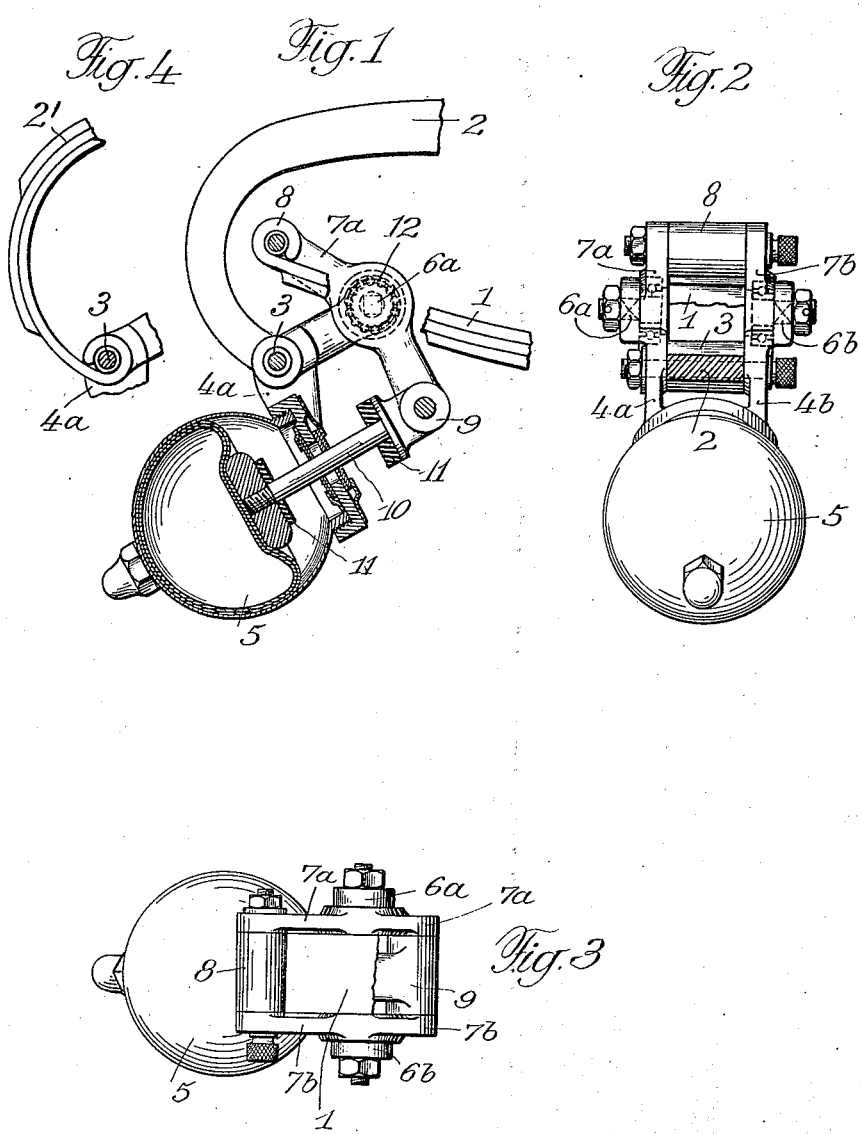

1,438,115

UNITED STATES PATENT OFFICE.

ALFRED JOËL, OF ZURICH, SWITZERLAND.

SPRING DEVICE FOR VEHICLES.

Application filed March 29, 1922. Serial No. 547,817.

*To all whom it may concern:*

Be it known that I, ALFRED JOËL, a citizen of the Republic of Switzerland, residing at Zurich, Switzerland, have invented certain new and useful Improvements in Spring Devices for Vehicles, of which the following is a specification, reference being had therein to the accompanying drawing.

The invention relates to improvements in spring devices for vehicles and particularly to arrangements in which an auxiliary spring of the air cushion type is interposed between the frame extension of the vehicle and the body spring or between other parts of the running gear of the vehicle.

Spring devices for vehicles are known in which the eye of the laminated plate spring supported by the axle is situated above the eye of the frame extension of the vehicle, the two eyes being connected together by means of spring shackles which are in this arrangement subjected to tension stresses.

It has further been proposed to replace the aforementioned spring shackles by auxiliary spring arrangements whereby shocks occurring in the main springs are taken up by the auxiliary spring. The auxiliary spring arrangement comprises in this case levers coupled together in a scissors-like fashion which allow of a free working of the auxiliary spring device when a momentary lengthening or shortening for instance of the plate spring supported by the wheel axle occurs.

With the auxiliary spring arrangement of the above type the ends of the levers to which the auxiliary spring elements are attached move away from each other, and therefore tension springs have to be used as spring elements the disadvantages of which are well known. Air-cushion devices to act as auxiliary springs which are particularly suited for this purpose cannot be utilized in such arrangements.

The disadvantages inherent to the above mentioned arrangements are overcome by the object of the present invention, i. e. a spring device for vehicles of the above mentioned type in which an auxiliary spring arrangement of the air-cushion type is interposed between the plate spring supported by the axle and a part fixed to the body frame,—for instance the frame extension of the vehicle or a further plate spring connected to the frame, the connection between the auxiliary spring arrangements and said parts of the vehicle being effected by a pair of levers pivoted together. The novel arrangement is characterized by the fact that the lever mechanism is operatively connected to said parts of the vehicle and to the air-cushion device in such a manner that the shocks transmitted by the plate springs cause the operative parts of the air-cushion device to be moved against each other, whereby an effective absorbing of the shocks occurs.

Preferably the levers consist each of twin elements arranged parallel to each other, between which elements the lower plate spring carrying the vehicle axle can pass so that the danger of the levers abutting against the lower plate spring is entirely avoided. In this manner the device according to the invention can be fitted to any vehicle without having to alter the main springs.

One constructional example of the object of the invention is illustrated on the accompanying drawing, in which:

Fig. 1 is a side view of the spring device with some parts shown in section,

Fig. 2 is an end view seen from the left hand side of Fig. 1, and

Fig. 3 is a plan view.

Fig. 4 is a detail modification.

1 denotes the main plate spring arranged in the longitudinal direction of the vehicle, for instance of the motor-car and supported by the axle of the vehicle, 2 is the frame extension of the vehicle. Instead of the frame extension 2 a further plate spring 2′ fixed to the frame of the vehicle may be provided as is shown in Fig. 4. The eye 3 of the extension part 2 or of the plate spring 2′ acts as fulcrum to the two parallel elements 4$^a$ and 4$^b$ forming one arm of a bell crank lever which elements carry at their ends pointing in the downward direction the receptacle for the air-cushion 5 of the auxiliary spring device. The other arm of the bell crank lever formed by the two elements 4$^a$ and 4$^b$ pointing in the upward direction which are cranked in an outward direction when seen in the end view are pivoted at 6$^a$ and 6$^b$ to the central eyes of a one-armed lever formed by the parallel twin elements 7$^a$ and 7$^b$. The pin effecting the pivotal connection between said elements 4$^a$ and 4$^b$ and the elements 7$^a$, 7$^b$ is mounted in ball bearings 12 inserted in said central eyes. The part of the arm of the latter lever pointing in an upward oblique direction is of the same length as the arm of the bell crank lever 4$^a$, 4$^b$ that points in the upward direction and the one armed lever has its fulcrum in the eye 8 of the plate spring 1, the head 9 of the piston rod 10 of the air cushion device being pivoted to the ends of the arm parts 7$^a$, 7$^b$ that point in the downward direction. As no stroke limiting arrangement is provided in the lever mechanism two buffers 11 of leather or of india rubber are provided on the piston rod 10, said buffers bearing against the cover of the receptacle for the air-cushion when the piston rod moves into its extreme positions owing to excessive oscillations of the spring device, whereby any harm to the single parts arising from shocks is excluded. It is to be seen from Figs. 1 and 3 that the plate spring 1 can freely pass between the lever elements in any position of the levers and the working of the device is thus not restricted by the levers or joints coming to bear against the plate spring 1. Upon shocks occurring in the vertical direction the arms of the levers 4$^a$, 4$^b$ and 7$^a$, 7$^b$ respectively pointing in the downward direction are nearer to each other whereby the piston is pressed towards the air cushion and the shocks are thus effectively absorbed.

The fact that the elements of the arms of bell-crank levers 4$^a$, 4$^b$ and of the levers 7$^a$, 7$^b$ that point in the upward direction are of equal length ensures such a distribution of the forces in the lever-system generated by shocks that the auxiliary spring device acts in any position without jamming and that no excessive friction in the joints presents itself, which friction is further reduced by utilizing ball bearings in at least one of the pivotal connections.

Further the arrangement shown enables designing the arms of the lever mechanism of a sufficient length so that a sufficient length of stroke for the air-cushion device is attained without fear of the latter or the coupling joints abutting against the lower plate spring.

I claim:

1. A spring device for vehicles having a body spring provided with an eye in its end and a body member having an eye in its end positioned below the eye of said spring, comprising in combination a lever arranged to be pivoted at one end to the eye of said spring, a second lever arranged to be pivoted between its ends to the eye of said member with one end pivoted between the ends of the first lever, a spring device mounted on the other end of said second lever, and means pivoted on the other end of the first lever operating on the spring device.

2. A spring device for vehicles, comprising in combination a member connected to the body part of the vehicle, a plate spring adapted to be supported on a vehicle axle and having its end situated above the end of said member, a lever articulated with its one end to the end of the plate spring, a two-armed second lever having its fulcrum at the end of said member and pivoted with the end of one arm to the first mentioned lever, a receptacle for the air-cushion of an air-cushion device secured to the other arm of the second lever, and a piston cooperating with said air-cushion and having its rod pivoted to the free end of the first mentioned lever, whereby the shocks transmitted by the parts to which the lever mechanism is attached cause the air-cushion and piston to be moved against each other.

3. A spring device for vehicles, comprising in combination a member connected to the body part of the vehicle and provided with an eye at its end, a plate spring adapted to be supported on a vehicle axle and having its end provided with an eye situated above the eye of said member, a one armed lever having its fulcrum in the eye of the plate spring, a two armed bell crank lever having its fulcrum in the eye of the member and pivoted with the end of one arm to the first mentioned lever, a receptacle for the air-cushion of an air-cushion device secured to the other arm of the bell crank lever, and a piston co-operating with said air-cushion and having its rod pivoted to the free end of the one armed lever, whereby the shocks transmitted by the parts to which the lever mechanism is attached cause the air-cushion and piston to be moved against each other.

4. A spring device for vehicles, comprising in combination a plate spring connected to the frame of the vehicle and provided with an eye at its end, a second plate spring adapted to be supported on a vehicle axle and having its end provided with an eye situated above the eye of the first mentioned plate spring, a one armed lever consisting of twin elements arranged to either side of the second plate spring and having its fulcrum in the eye of the second plate spring, a two-armed bell-crank lever consisting of twin elements and having its fulcrum in the eye of the first plate spring and pivoted with the end of one arm to the first mentioned lever, a receptacle for the air-cushion of an air-cushion device secured to the other arm of the bell-crank lever, and a piston co-operating with said air cushion and having its rod pivoted to the free end of the one armed lever, whereby the shocks transmitted by said plate springs cause the air-cushion and piston to be moved against each other.

In testimony whereof I affix my signature.

ALFRED JOËL.